United States Patent [19]
Caldwell et al.

[11] 3,768,276
[45] Oct. 30, 1973

[54] AIR-COOLED RESILIENT COUPLING ASSEMBLY

[75] Inventors: Samuel I. Caldwell, Aurora; Lawrence R. Cline, Oswego, both of Ill.

[73] Assignee: Caterpillar Tractor Co., Peoria, Ill.

[22] Filed: Apr. 10, 1972

[21] Appl. No.: 242,723

[52] U.S. Cl. .......... 64/11 R, 64/27 NM, 192/113 A
[51] Int. Cl. .............................................. F16d 3/28
[58] Field of Search ............ 64/27 NM, 27 R, 11 R; 192/113 A

[56] References Cited
UNITED STATES PATENTS

| | | | |
|---|---|---|---|
| 2,232,454 | 2/1941 | Haupt | 192/113 A |
| 2,290,542 | 7/1942 | Criley | 192/113 A |
| 3,002,597 | 10/1961 | Warman et al. | 192/113 A |
| 1,767,309 | 6/1930 | Ricardo | 192/113 A |
| 3,678,708 | 7/1972 | Ernst et al. | 64/11 R |

FOREIGN PATENTS OR APPLICATIONS

| | | | |
|---|---|---|---|
| 556,680 | 10/1942 | Great Britain | 64/27 R |

*Primary Examiner*—Charles J. Myhre
*Assistant Examiner*—Randall Heald
*Attorney*—Martin Majestic et al.

[57] ABSTRACT

A resilient coupling assembly is provided having a housing with intake and exhaust ports arranged so that rotation of the coupling is utilized to produce a vortex flow of cooling air through the housing and past the coupling in order to minimize thermal failures and thereby increase operating life of the assembly.

8 Claims, 5 Drawing Figures

AIR-COOLED RESILIENT COUPLING ASSEMBLY

BACKGROUND OF THE INVENTION

Resilient drive couplings are employed in drive trains to reduce the transmission of undesirable vibration therethrough and to accommodate minor misalignment of the drive train components. Such couplings employ resilient elements as load transmitting members between the opposite connector portions thereof. During operation, the resilient elements of the couplings continually flex and bend, producing an undesirable buildup of heat energy in the coupling. If not quickly dissipated, such heat leads to rapid deterioration of the resilient elements, requiring their frequent replacement. This of course is a tedious, time-consuming and expensive undertaking.

The problem is further compounded when it is necessary to enclose such couplings in a housing to provide protection from adverse environmental conditions common in vehicular applications or to satisfy safety requirements for stationary operation. In addition, such housings often serve as a support structure for bearings and other rotating elements of the drive train requiring lubrication which is usually provided by an internal oil supply. Consequently, excessive coupling operating temperatures increase the temperature of the oil and other adjacent components, reducing their efficiency and effective service life.

SUMMARY AND OBJECTS OF THE INVENTION

Accordingly, it is an object of the present invention to provide an improved air-cooled resilient coupling assembly.

Another object of this invention is to provide such an improved air-cooled resilient coupling assembly having a ported housing which utilizes the rotational movement of the coupling as a fan to create a flow of coolant air through the housing in cooling relation to the coupling.

Other objects and advantages of the present invention will become more readily apparent upon reference to the accompanying drawings and following description.

DESCRIPTION OF THE PREFERRED EMBODIMENT

Figure 1:
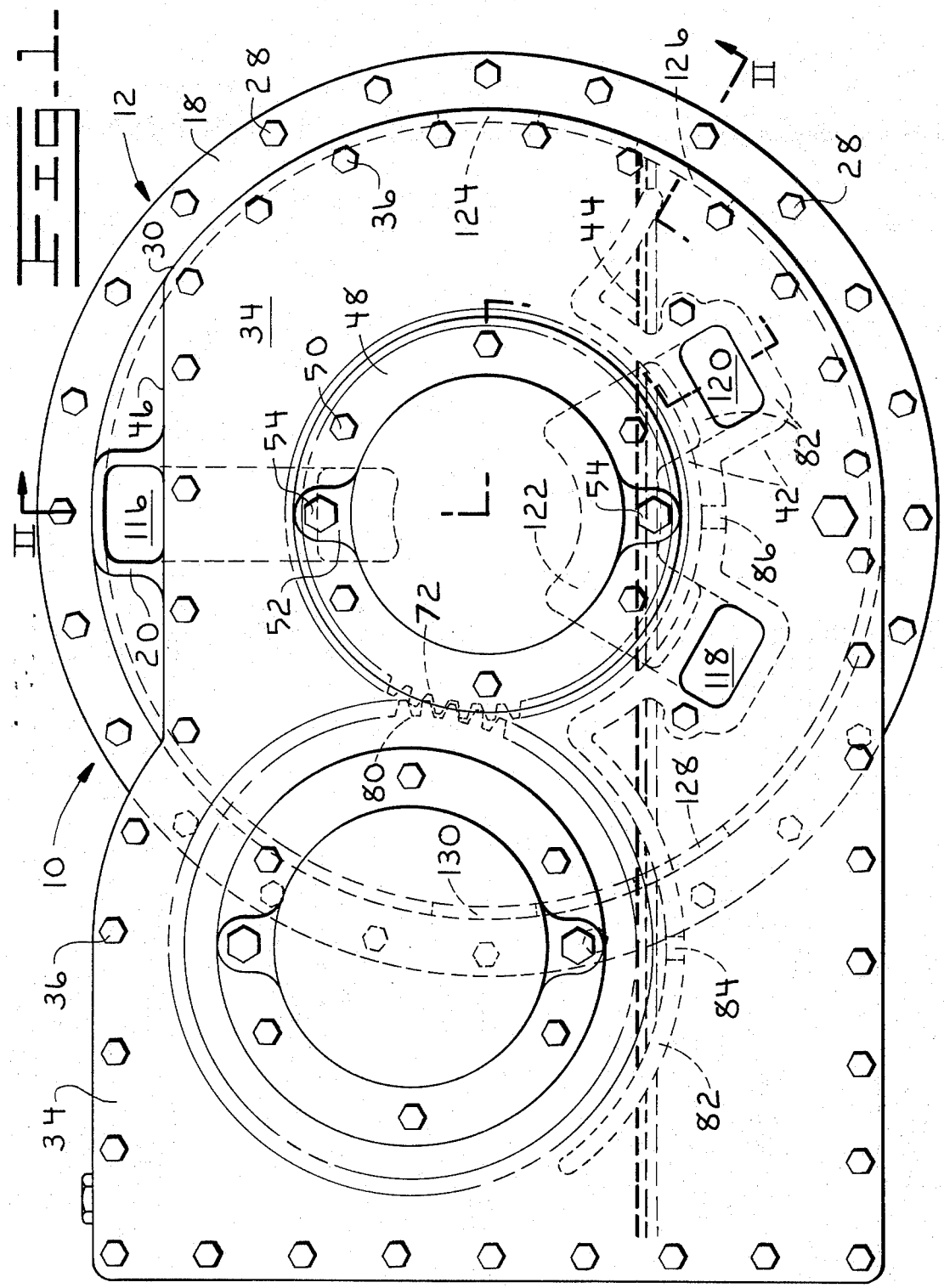
FIG. 1 is an end elevational view of an air-cooled resilient coupling assembly illustrating the preferred embodiment of the present invention.
Figure 2:
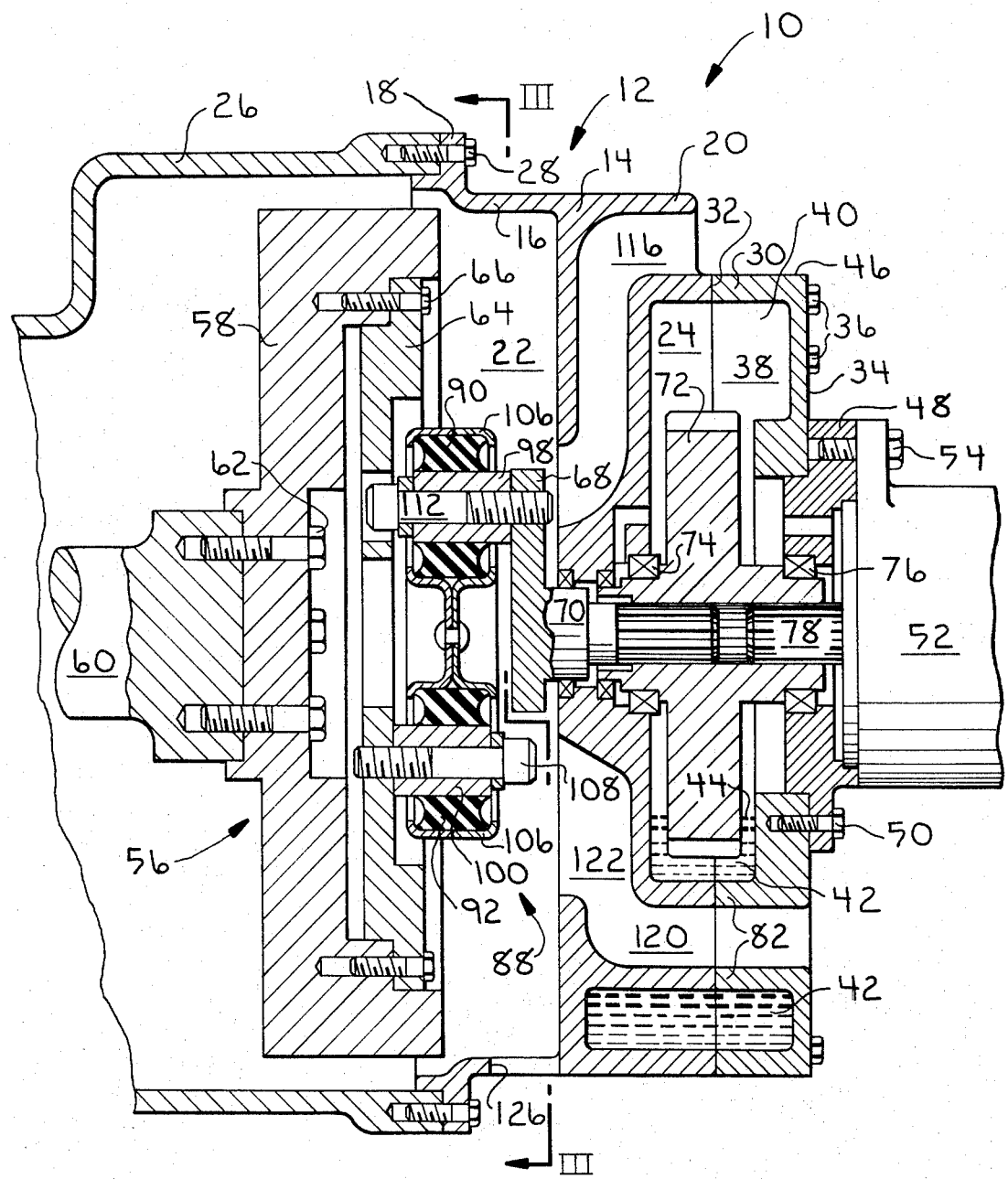
FIG. 2 is a longitudinal vertical sectional view through the resilient coupling assembly taken generally along the line II–II of FIG. 1.

With particular reference to FIGS. 1 and 2 of the drawings, an air-cooled resilient coupling assembly 10, embodying the principles of the present invention, has a housing which is shown generally at 12. The housing includes a central portion 14 having a substantially circular external wall 16 having a radially directed, flanged end 18, and an opposite, longitudinally directed, ported end 20. A generally cylindrical coupling receiving chamber 22 is formed within the flanged end of the central portion of the housing and a cup-shaped recess 24 is formed in the ported end thereof. The flanged end 18 is attached to a circular, relatively large diameter portion 26 of the housing by a plurality of capscrews 28.

The housing 12 further includes a substantially circular cover section 30 defining an inner end 32 and an outer end 34. The inner end 32 is disposed in substantially covering relation to the ported end 20 of the central portion 14. The cover section is releasably retained in the described assembly by a plurality of capscrews 36. The inner end 32 has a cup-shaped recess 38 formed to coincide with the recess 24 in the ported end 20 of the central portion of the housing to thereby provide a gear receiving chamber 40 having a lower oil sump 42 which normally contains during operation a predetermined volume of gear and bearing lubricating oil 44. The cover section has an upper, substantially flat chordal surface 46 radially inwardly spaced from the upper periphery of the central portion 14 of the housing. A substantially circular adapter ring 48 is mounted on the outer end 34 of the cover portion of the housing by a plurality of capscrews 50. The adapter ring provides an outer mounting surface for an auxiliary pump, partially shown at 52, which is joined to the adapter ring by a pair of capscrews 54.

Figure 3:
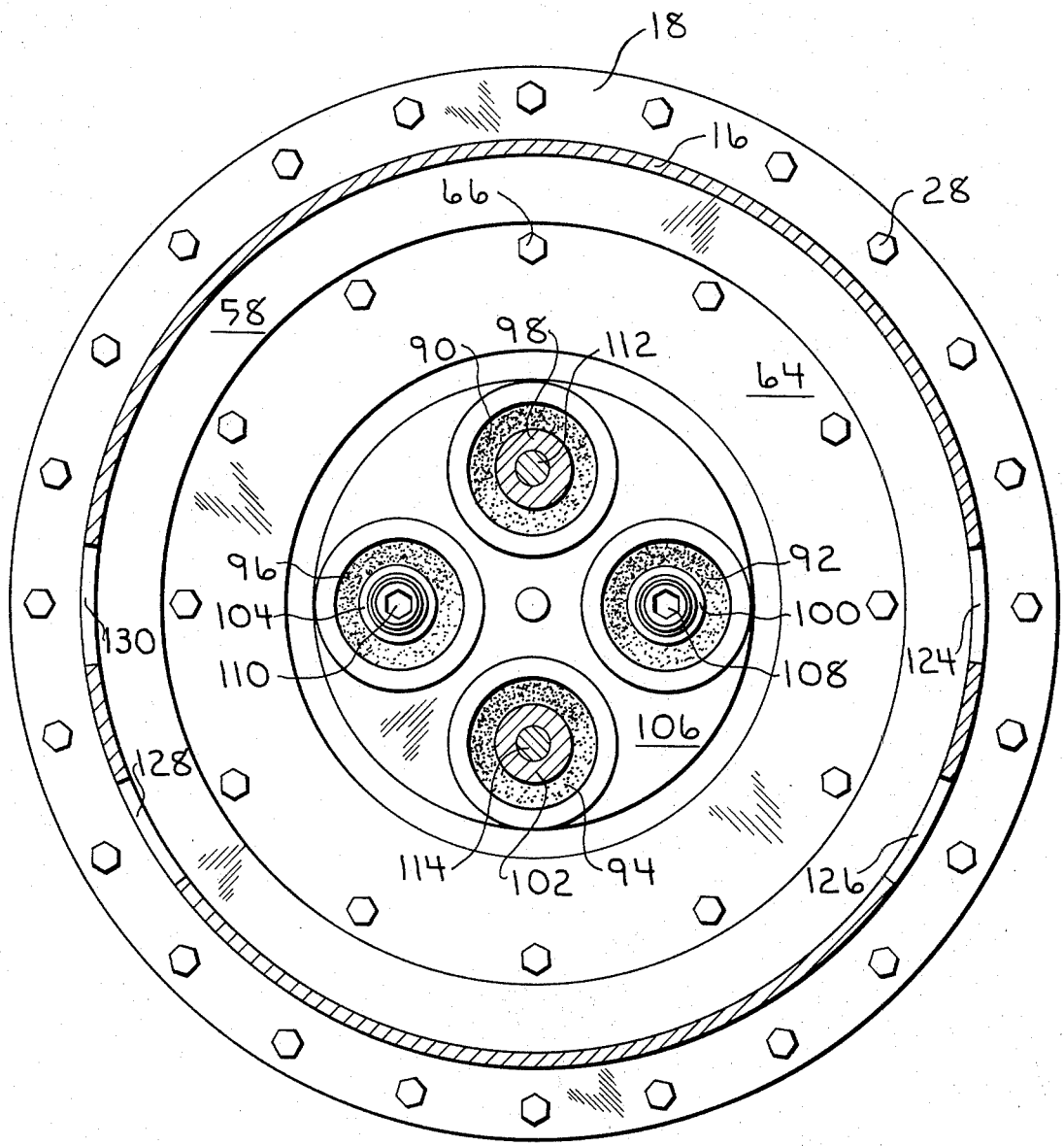
FIG. 3 is a transverse vertical sectional view of the resilient coupling assembly taken substantially along the line III–III of FIG. 2.

Housing 12 encloses a drive train assembly generally indicated at 56. As best shown in FIGS. 2 and 3, a generally circular flywheel 58 is attached to an input shaft 60 by a plurality of bolts 62 and to a generally circular flywheel adapter hub 64 by bolts 66. A coupling yoke 68 is welded or otherwise fixedly attached to an output stub shaft 70 which is externally splined to engage a mating internal spline in a gear 72. The gear is rotatably supported at one end by a bearing 74 mounted in the ported end of the central portion 14 of the housing and at its opposite end by a bearing 76 mounted in the adapter ring 48. A pump shaft 78 is also externally splined so as to engage the internal spline of gear 72 so that the gear provides a direct mechanical drive between the output stub shaft 70 and the pump shaft. Also, as shown in FIG. 1, the gear teeth of gear 72 mesh with the gear teeth of an auxiliary drive gear 80, thereby providing a gear drive for additional accessories.

Lubrication for bearings 74 and 76 and gears 72 and 80 is provided by splash action from lubricating oil 44 contained in the lower sump 42 of the chamber 40. An internal baffle wall 82 serves to limit turbulence created by immersion of the gear teeth into the oil bath. Apertures 84 and 86 permit oil to flow through the internal baffle wall to replace oil picked up by the rotating gears.

A resilient coupling indicated generally at 88 joins the flywheel adapter hub 64 to the coupling yoke 68. The coupling has a plurality of cylindrical blocks 90, 92, 94, and 96, of resilient material such as rubber or the like, individually mounted on a corresponding number of rigid spacer sleeves 98, 100, 102, and 104. A two-piece block mounting carrier 106 of rigid material such as formed sheet metal has a plurality of circumferentially equally-spaced cups individually encasing the blocks. Coupling 88 is joined to flywheel adapter hub 64 by a bolt 108 and a bolt 110 extending through spacer sleeves 100 and 104, respectively, and is similarly joined to coupling yoke 68 by a bolt 112 and a bolt 114 extending through spacer sleeves 98 and 102, respectively.

The housing 12 of the present invention provides for air-cooling of the resilient coupling 88 and the lubricating oil in the gear chamber 40 without additional fans or other cooling devices. This is accomplished by a plurality of passages in the ported end 20 of the central portion 14 of the housing which includes an upper inlet air passage 116 of substantially rectangular cross-section that opens outwardly of the housing immediately above the flat surface 46 of the cover section 30. The upper inlet air passage extends radially inwardly and opens into the coupling chamber 22 adjacent to the yoke 68.

A pair of spaced lower inlet air passages 118 and 120, of substantially rectangular cross section, are formed through the ported end 20 of the central portion of the housing and through the cover section 30. As best shown in FIG. 2, the lower inlet air passages are substantially surrounded by lubricant in the oil sump 42 of gear chamber 40. Both of the lower inlet air passages extend radially inwardly and terminate in a common arcuate outlet 122 disposed adjacent to the yoke 68 on the coupling 88. A plurality of substantially rectangular air discharge ports 124, 126, 128, and 130 are formed in external wall 16 of the central portion 14, thereby providing an exit for air circulating through the housing.

Figure 4:
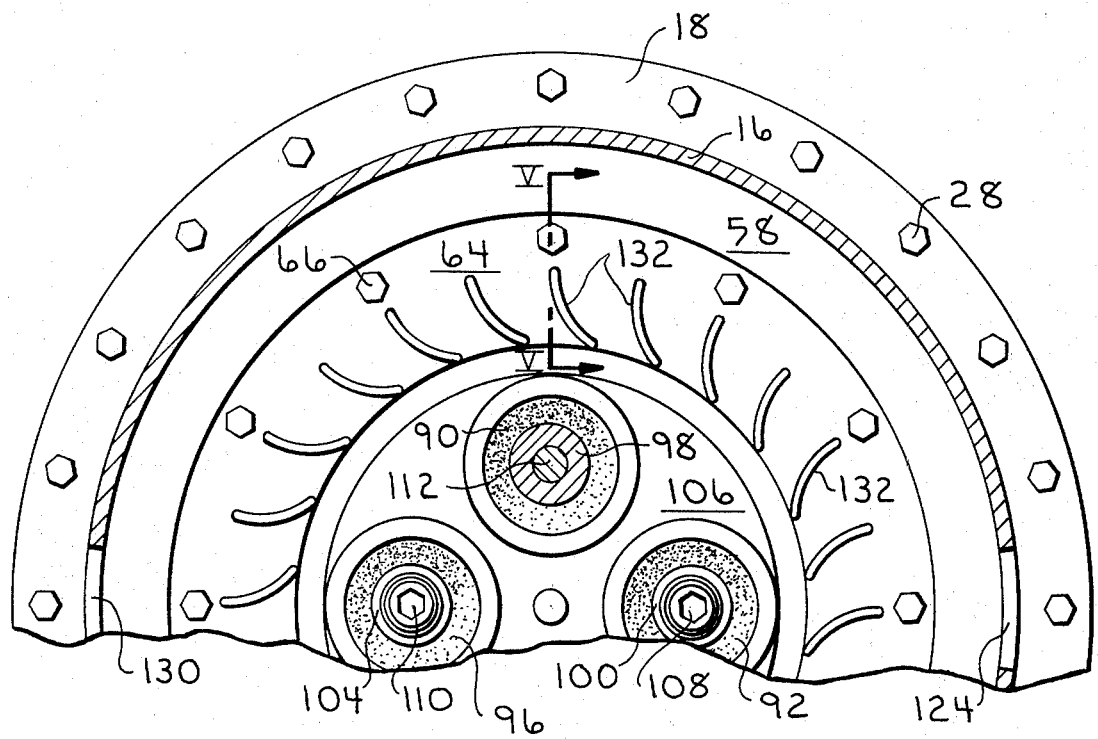
FIG. 4 is a partial transverse vertical sectional view similar to FIG. 3 illustrating a second embodiment of the present invention.
Figure 5:
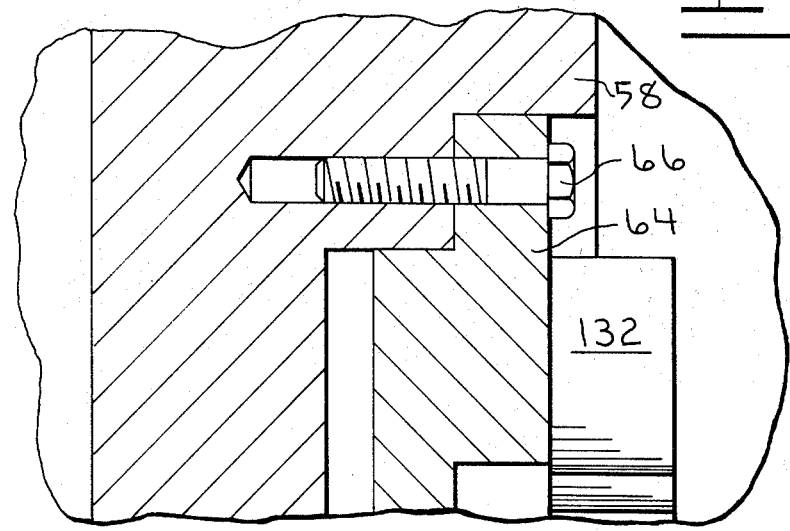
FIG. 5 is an enlarged partial vertical sectional view taken generally along the line V–V of FIG. 4 showing further details of the second embodiment.

A second embodiment of the present invention is provided for increasing the flow of cooling air through the coupling chamber 22 as shown in FIGS. 4 and 5. In this embodiment, a plurality of airfoil vanes 132 are fixed to a flywheel adapter plate 64 as indicated in the drawings. These vanes, curved in the direction of rotation, may be formed as an integral part of the adapter plate.

OPERATION OF THE PREFERRED EMBODIMENT

While the operation of the present invention is believed clearly apparent from the foregoing description, further amplification will subsequently be made in the following brief summary of such operation. As drive train assembly 56 rotates, the peripheral irregularities of the resilient coupling 88 act as fan elements swirling air about the coupling and generating a vortex circulation of air in chamber 22 of housing 12. The air thus swirled has a radial velocity component forcing the air to move in a generally spiral path toward the outer circumference of the chamber to be subsequently exhausted through discharge ports 124, 126, 128, and 130.

To replace the air thus exhausted, ambient air surrounding housing 12 is drawn into the central area of chamber 22 through inlet air passages 116, 118, and 120. The air is then swirled by the coupling and impelled toward the external wall of the housing for discharge through the exhaust ports. A continuous flow of air is thus maintained, cooling blocks 90, 92, 94, and 96 of the resilient coupling, thereby permitting the coupling and drive train members to operate at a reduced temperature level.

This air flow also maintains the oil contained in sump 42 at a lower temperature than would ordinarily be the case, since heat energy generated by the resilient coupling is transferred to the air stream and exhausted instead of being transferred to metal surfaces of the housing and subsequently to the lubricating oil. Also, the routing of the inlet air passages 118 and 120 through the oil sump contributes significantly to maintenance of a reduced oil temperature by providing cooled wall surfaces in the sump cavity for absorption of heat from the lubricating oil.

An additional benefit of the cooling arrangement of the present invention is derived from the respective positions of the inlet air passages 116, 118, and 120, and auxiliary units such as the pump 52 mounted on the housing. This arrangement provides circulation of ambient air about the auxiliary members, thereby aiding the cooling of these units.

If the temperature of the ambient air used to provide cooling is elevated due to a particular operating condition, e.g., higher than normal ambient air temperature, then additional air may be required to adequately maintain operation at a desired termperature level. It is to this particular need that a second embodiment, shown in FIGS. 4 and 5, is provided. A plurality of vanes 132 on flywheel adapter plate 64 act in cooperation with the described coupling irregularities to increase the flow of cooling air through chamber 22.

While the invention has been described and shown with particular reference to the preferred embodiments, it will be apparent that variations might be possible that would fall within the scope of the present invention which is not intended to be limited, except as defined in the following claims.

We claim:
1. A coupling assembly comprising;
a sump in said housing;
a plurality of air intake passages arranged in said housing wherein at least one of said plurality of air intake passages is located so as to be in heat transferring relation to said sump whereby the flow of air through at least one of said passages cools lubricating oil contained within said sump;
a plurality of air exhaust ports disposed about the periphery of said housing; and
a plurality of peripheral irregularities on said coupling serving as fan elements to draw cooling air into said housing through said intake passages and to induce a flow of cooling air around said coupling for receiving heat energy therefrom with the air being discharged from said housing through said exhaust ports thereby permitting a reduced-temperature operating environment for said coupling assembly.

2. The invention of claim 1 wherein said plurality of air intake passages are located so as to deliver cooling air from outside said housing adjacent the radially innermost point in said housing.

3. The invention of claim 1 wherein said exhaust ports are located radially outwardly of said coupling and in substantial radial alignment therewith.

4. The invention of claim 1 wherein said coupling includes resilient means whereby said coupling assembly is a resilient coupling assembly.

5. The invention of claim 1 including a plurality of vanes rotatable with said coupling to further increase the flow of cooling air about said coupling.

6. A coupling assembly comprising:

a drive coupling having an irregular peripheral surface, a stationary housing having a circumferentially disposed wall forming a substantially cylindrical chamber having a central area receiving said coupling;

a sump chamber adapted for containing lubricating oil included in said stationary housing, a plurality of substantially exially disposed intake air passages arranged in said housing to channel a supply of cooling air from the exterior of said housing to the central area of said chamber wherein at least one of said intake passages passes through said sump chamber to cool said lubricating oil; and a plurality of exhaust ports arranged in the wall of said chamber radially outwardly of said coupling and in substantial radial alignment therewith to permit substantially radial discharge of air from said chamber, said irregular peripheral surface of the coupling serving as a fan during its rotation to circulate a flow of cooling air through said chamber in swirling relation about said coupling to increase the transfer of heat energy therefrom to permit said coupling to operate at a lower temperature level to minimize thermal failure.

7. The invention of claim 6 wherein said coupling includes resilient means.

8. The invention of claim 6 further including a plurality of vanes mounted for rotation with said irregular peripheral surface of the coupling to further increase the circulation of cooling air through said cylindrical chamber.

* * * * *

UNITED STATES PATENT OFFICE
CERTIFICATE OF CORRECTION

Patent No. 3,768,276  Dated October 30, 1973

Inventor(s) SAMUEL I. CALDWELL, ET AL

It is certified that error appears in the above-identified patent and that said Letters Patent are hereby corrected as shown below:

Column 4, after line 35 and before line 36, insert --a housing enclosing a coupling;--.

Signed and sealed this 3rd day of December 1974.

(SEAL)
Attest:

McCOY M. GIBSON JR.
Attesting Officer

C. MARSHALL DANN
Commissioner of Patents